(12) United States Patent
Haruguchi et al.

(10) Patent No.: US 7,199,949 B2
(45) Date of Patent: Apr. 3, 2007

(54) OPTICAL PICKUP DEVICE AND OPTICAL DISK DEVICE

(75) Inventors: Takashi Haruguchi, Fukuoka (JP); Junya Aso, Fukuoka (JP); Fuminobu Furukawa, Oonojyou (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 604 days.

(21) Appl. No.: 10/673,550

(22) Filed: Sep. 30, 2003

(65) Prior Publication Data

US 2004/0130977 A1 Jul. 8, 2004

(30) Foreign Application Priority Data

Oct. 2, 2002 (JP) .......................... P.2002-290051

(51) Int. Cl.
G02B 7/02 (2006.01)
G11B 7/00 (2006.01)

(52) U.S. Cl. .................. 359/814; 359/813; 359/824; 369/44.15; 369/44.16

(58) Field of Classification Search ................ 359/811, 359/813, 814, 823, 824; 369/44.11, 44.14–44.16, 369/44.22–44.24, 44.32, 44.41, 53.19, 53.28, 369/112.23
See application file for complete search history.

(56) References Cited

U.S. PATENT DOCUMENTS

| | | | |
|---|---|---|---|
| 4,987,565 A * | 1/1991 | Ikegame | 369/44.15 |
| 5,206,849 A * | 4/1993 | Yamamoto et al. | 369/44.16 |
| 5,561,648 A | 10/1996 | Song | 369/44.15 |
| 6,195,314 B1 * | 2/2001 | Inui et al. | 369/44.14 |
| 6,567,352 B1 * | 5/2003 | Inui et al. | 369/44.21 |
| 6,570,720 B2 * | 5/2003 | Kawano | 359/813 |
| 6,680,883 B2 * | 1/2004 | Inui et al. | 369/44.14 |
| 2003/0067848 A1 | 4/2003 | Kabasawa et al. | |

FOREIGN PATENT DOCUMENTS

| | | |
|---|---|---|
| CN | 1122040 | 5/1996 |
| JP | 1031829 | 2/1998 |
| JP | 11296884 | 10/1999 |
| JP | 2000123381 | 4/2000 |
| JP | 2001126286 | 5/2001 |
| JP | 2002312967 | 10/2002 |
| JP | 2003109234 | 4/2003 |

* cited by examiner

Primary Examiner—Loha Ben
(74) Attorney, Agent, or Firm—Stevens, Davis, Miller & Mosher, LLP

(57) ABSTRACT

The present invention provides an optical pickup device comprising a light condensing means for condensing light emergent from a light source to an optical disk, a light condensing holder on which the light condensing means is mounted, a suspension holder for elastically supporting the light condensing holder, a focus coil mounted on the light condensing holder, a tracking coil mounted on the light condensing holder, and a magnetic field impression means for impressing a magnetic field upon the focus coil and the tracking coil, wherein the tracking coil is composed of a first to a third tracking coil portion combined with each other.

13 Claims, 5 Drawing Sheets

[Fig. 4]
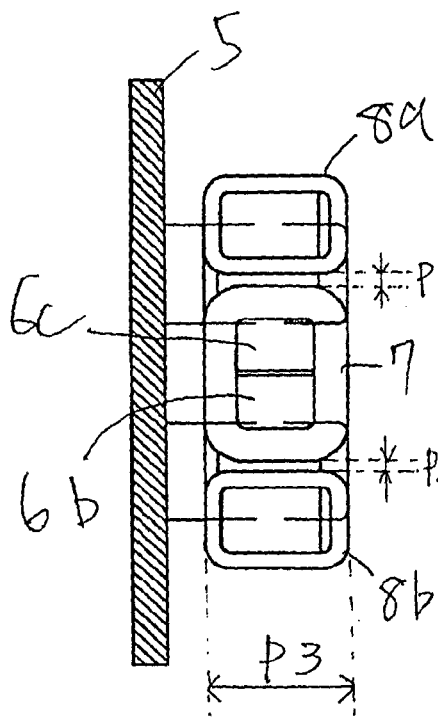
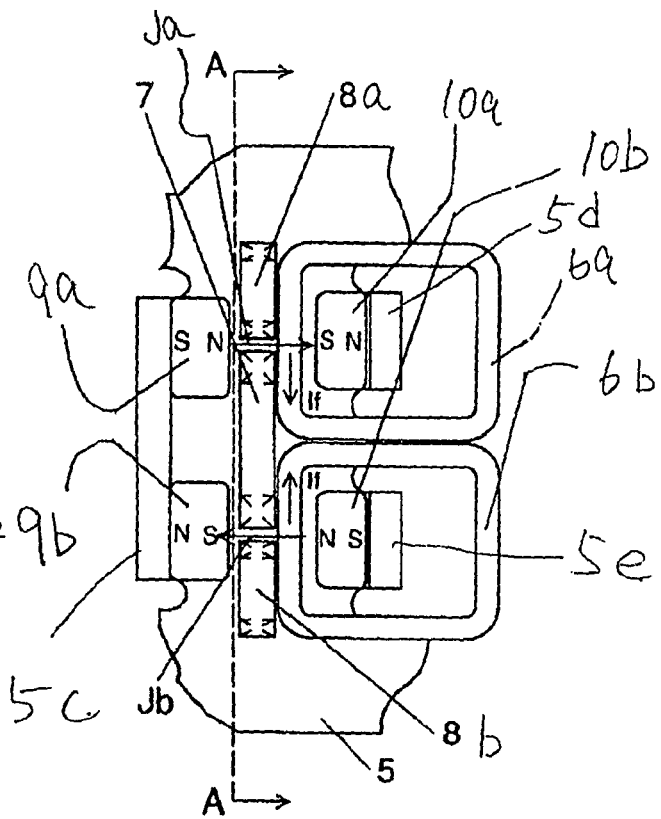
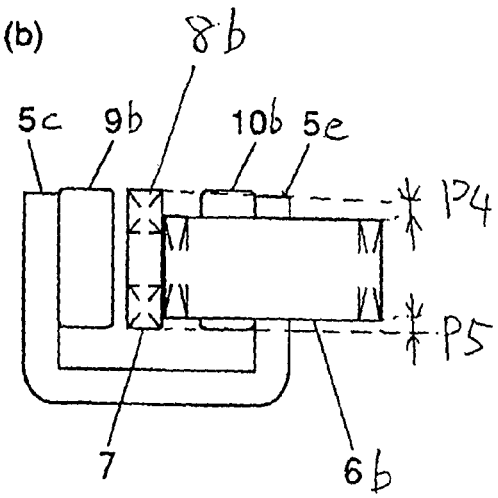

Fig 5 (a)
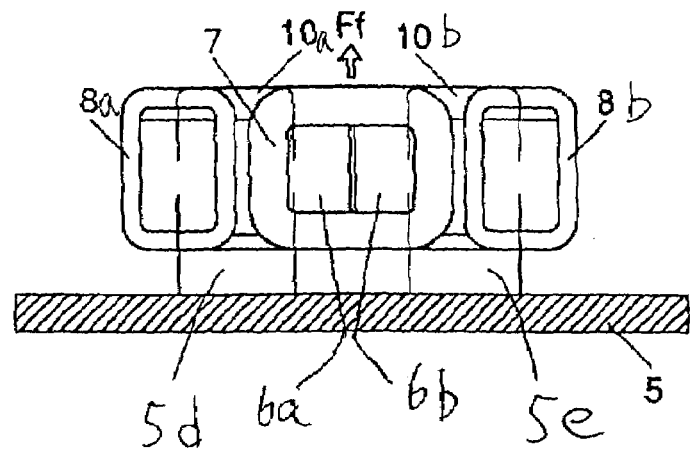
(b)
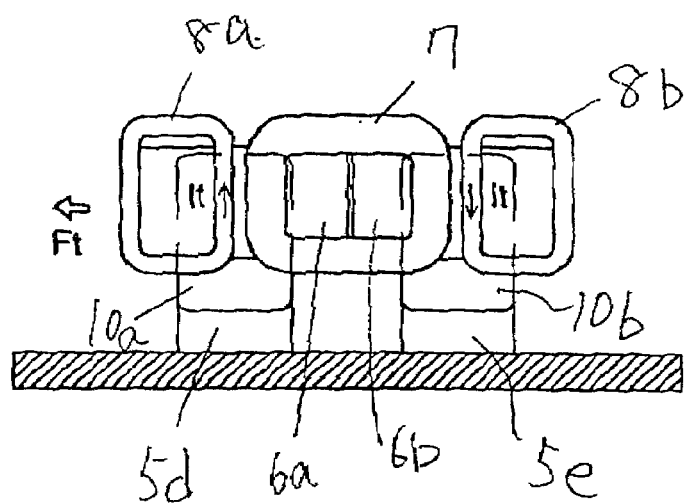
(c)
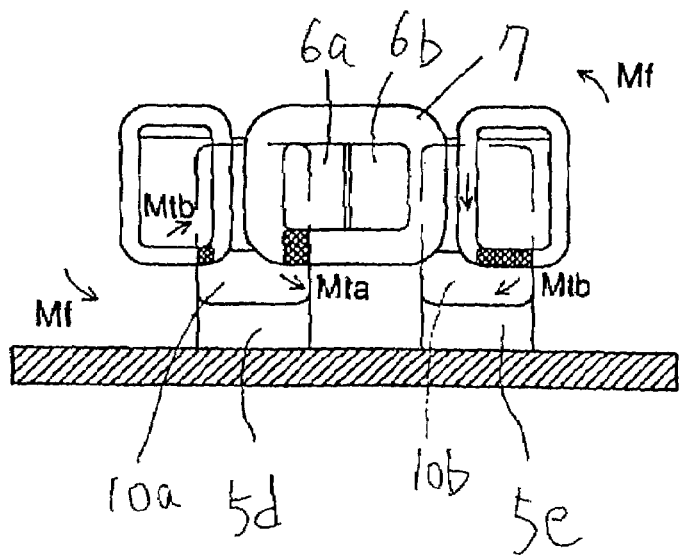

OPTICAL PICKUP DEVICE AND OPTICAL DISK DEVICE

BACKGROUND OF THE INVENTION

1. Field of the Invention

The present invention relates to an optical pickup device used for recording and reproducing information on a high density recording disk such as a DVD and information on a low density recording disk such as a compact disk and the like. More particularly, the present invention relates to an optical pickup device in which a tilt caused by a lens shift is self-canceled so that a radial tilt can be conducted. The present invention also relates to an optical disk device on which the optical pickup device is mounted.

2. Description of the Related Art

In the case of a conventional optical pickup device, it has been known that an objective lens is inclined, which is referred to as a tilt hereinafter, due to the structure of a magnetic circuit when a focusing motion and a tracking motion are simultaneously conducted which is referred to as a lens shift hereinafter. In order to prevent the occurrence of the above problems, there is proposed an optical pickup device in which the structure of the magnetic circuit is devised so that no tilt is caused even when the lens is shifted. For example, refer to JP-A-10-031829 (pages 3 to 4, FIGS. 4, 5 and 6).

Since the high density recording disk such as a DVD has widely spread, there is a demand for an optical disk device by which information on the high density recording disk can be reproduced and recorded in the same manner as that of the conventional optical disk device for recording and reproducing information on the low density recording disk.

However, in the case of the high density recording disk, the recording density is so high that the tolerance (tilt margin) with respect to an inclination angle of the objective lens is far narrow. Therefore, it is demanded to the optical disk device that reproducing and recording can be conducted even when the optical disk is warped.

SUMMARY OF THE INVENTION

It is an object of the present invention to provide an optical pickup device capable of self-canceling a tilt caused by a lens shift and generating a twisting tilt in the radial direction, by adding a controlled tilt as an optical pickup device in which the tilt can be self-canceled.

The present invention provides an optical pickup device comprising: a movable portion having an objective lens, a lens holder for holding the objective lens and a drive means for driving the lens holder; and a fixing portion having an elastic member for elastically supporting the movable portion, a suspension holder for supporting and fixing one end of the elastic member and a yoke for supporting the suspension holder and composing a portion of a magnetic circuit of the drive means, wherein the yoke composes a first and a second vertical portion for forming the magnetic circuit, the first vertical portion disposes a first and a second magnet, the second vertical portion branches to two vertical yokes in which a third and a fourth magnet are respectively arranged, the first to the fourth magnet are arranged so that a magnetic flux connecting the first magnet with the third magnet, which are opposed to each other, and a magnetic flux connecting the second magnet with the fourth magnet, which are opposed to each other, can be opposite to each other, the driving means has a focus coil for conducting a focusing motion and a tracking coil for conducting a tracking motion, the focus coil has a first and a second focus coil which are respectively wound round the two vertical yokes, and the tracking coil has a first tracking coil wound round the first and the second magnet, a second tracking coil, the winding side of 1 of which is arranged in the first magnet, and a third tracking coil, the winding side of 1 of which is arranged in the second magnet.

BRIEF DESCRIPTION OF THE DRAWINGS

FIG. 4 is a view for explaining a magnetic circuit portion of FIG. 2.

FIG. 5 is a view for explaining a motion of the magnetic circuit portion of FIG. 2.

DESCRIPTION OF THE PREFERRED EMBODIMENTS

Figure 1:
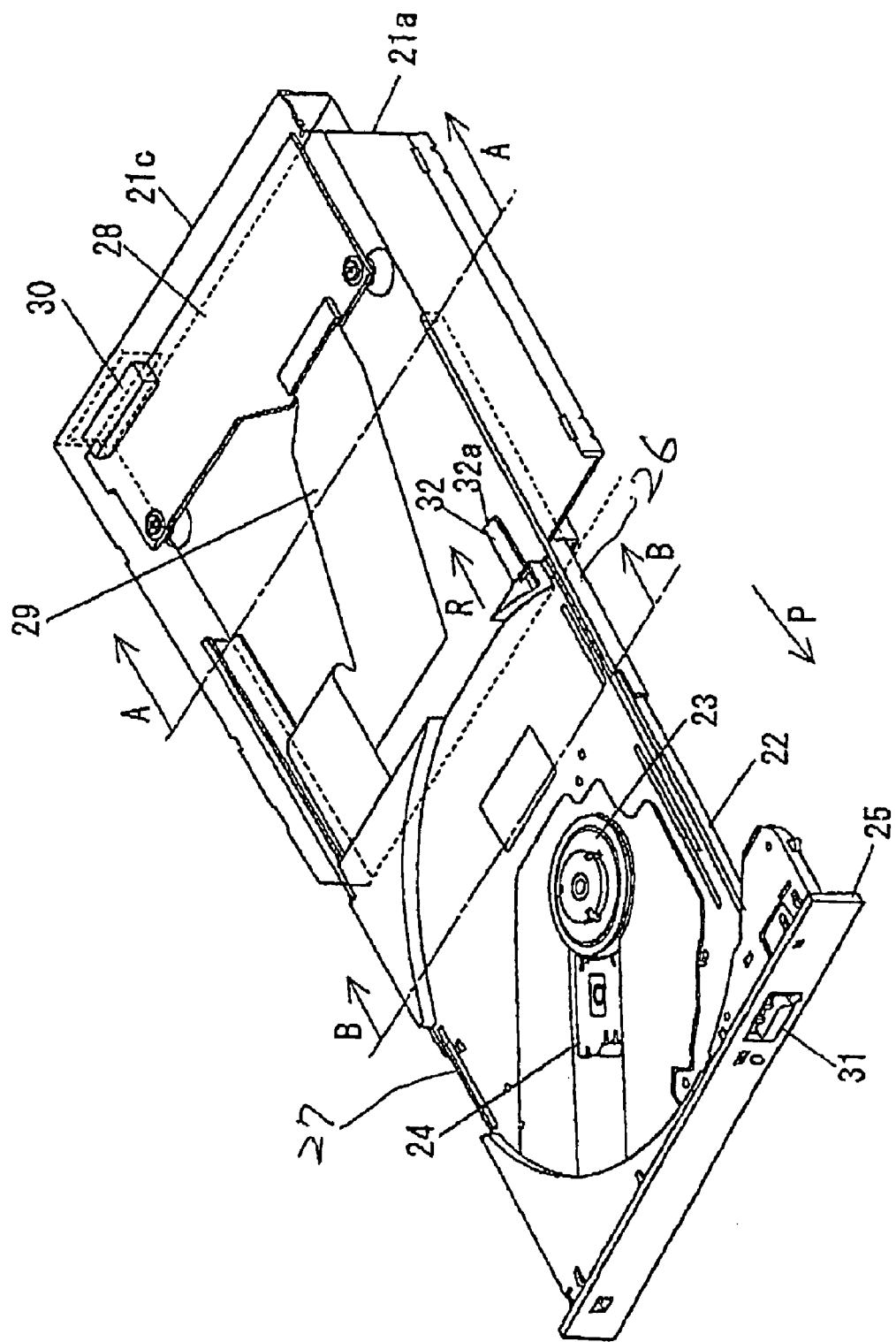
FIG. 1 is a perspective view of an optical disk device on which an optical pickup device of an embodiment of the present invention is mounted.

FIG. 1 is a perspective view of an optical disk device on which an optical pickup device of an embodiment of the present invention is mounted.

In FIG. 1, reference numeral 21 is a housing. The housing 21 is composed of an upper housing portion and a lower housing portion 21a which are combined with each other. In FIG. 1, the upper housing portion is omitted because of the convenience of explanations. In this connection, the upper housing portion and the lower housing portion 21a are fixed to each other with screws or the like. Reference numeral 22 is a retractable tray, reference numeral 23 is a spindle motor provided on the tray 22, and reference numeral 24 is an optical pickup device of an embodiment of the present invention. At least a light source not shown and each optical component are mounted on the optical pickup device 24. When the optical pickup device 24 irradiates light to the optical disk, at least one of the information writing motion and the information reading motion is conducted on the optical disk. Reference numeral 25 is a bezel arranged on the front end face of the tray 22. When the tray 22 is accommodated into the housing 21, the bezel 25 closes an opening for retraction of the tray 22. Reference numerals 26 and 27 are rails slidably attached to both the tray 22 and the housing 21. These rails 26 and 27 are arranged on both side portions of the tray 22. By these rails 26 and 27, the tray 22 is attached to the housing 21 so that the tray 22 can be freely retracted from the housing 21. Reference numeral 28 is a circuit board fixed at an inner portion of the housing 21. On the circuit board 28, IC of the signal processing system and the electric power supply circuit are mounted. Reference numeral 29 is a flexible printed board for electrically connecting a circuit board not shown provided on the tray 22 with the circuit board 28. This printed board 29 is formed into a substantial U-shape. Reference numeral 30 is an external connector, which is connected with an electric power supply/signal line provided in an electronic apparatus such as a computer. Electric power is supplied to the optical disk device via this external connector 30. Further, an electric signal sent from the outside is guided into the optical disk device via this external connector 30. Furthermore, electric signals generated in the optical disk device are sent out to the electronic apparatus via this external connector 30.

The bezel 25 arranged on the front end face of the tray 22 is provided with an eject button 31. When this eject button 31 is pressed, an engaging portion (not shown) arranged in the housing 21 and an engaging portion (not shown) arranged on the tray 22 are released from each other.

Reference numeral 32 is a push sheet metal movably held on the tray 22. The push sheet metal 32 is pushed in the direction of arrow R shown in FIG. 1 by an elastic means such as a spring not shown.

When the tray 22 is manually inserted into the housing 21, the forward end portion 32a of the push sheet metal 32 comes into contact with the inner portion 21c of the housing 21. When the tray 22 is further inserted into the housing 21, the push sheet metal 32 is pushed to the tray 22 side. When the tray 22 is furthermore inserted into the housing 21 by a predetermined distance, while resisting an elastic force of an elastic means arranged on the push sheet metal 32, the aforementioned engaging portions are engaged with each other, so that the tray 22 can be accommodated in the housing 21 and the tray 22 can not jump out from the housing 21 by an external force because the tray 22 is held in the housing 21.

Next, when the eject button 31 is pressed down and the above engaging portions are released from each other, the push sheet metal 32 pushes the inner portion 21c and the tray 22 is protruded from the housing 21 by a distance not less than a predetermined value. After that, the tray 22 is manually drawn out and the optical disk or the like is attached to the spindle motor.

When the optical pickup device 24 of the present invention, which will be explained below, is mounted on a thin type optical disk device, it is possible to obtain a sufficiently high recording or reproducing characteristic even if the device is made thin.

Figure 2:
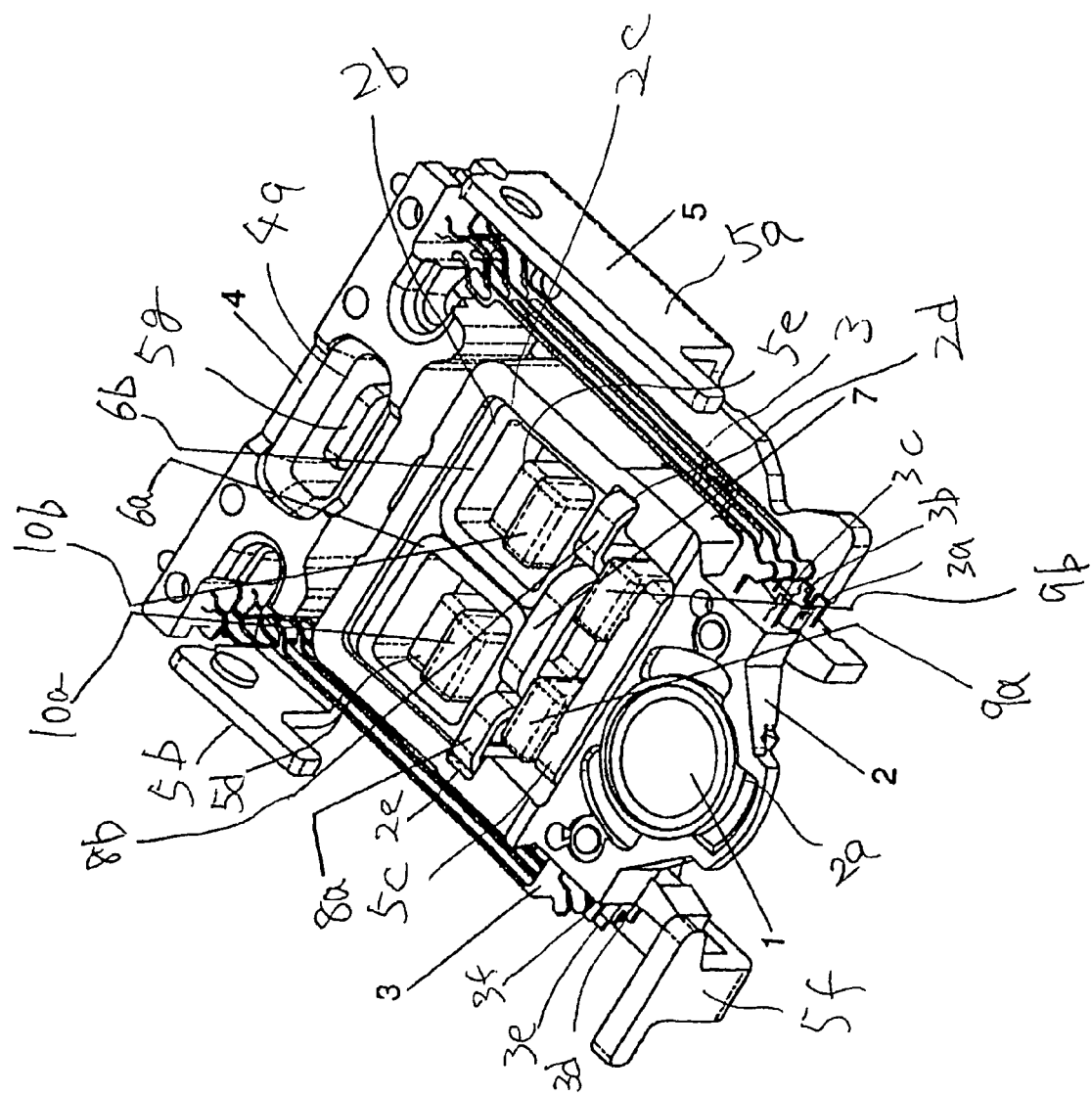
FIG. 2 is a perspective view of an optical pickup device of an embodiment of the present invention.
Figure 3:
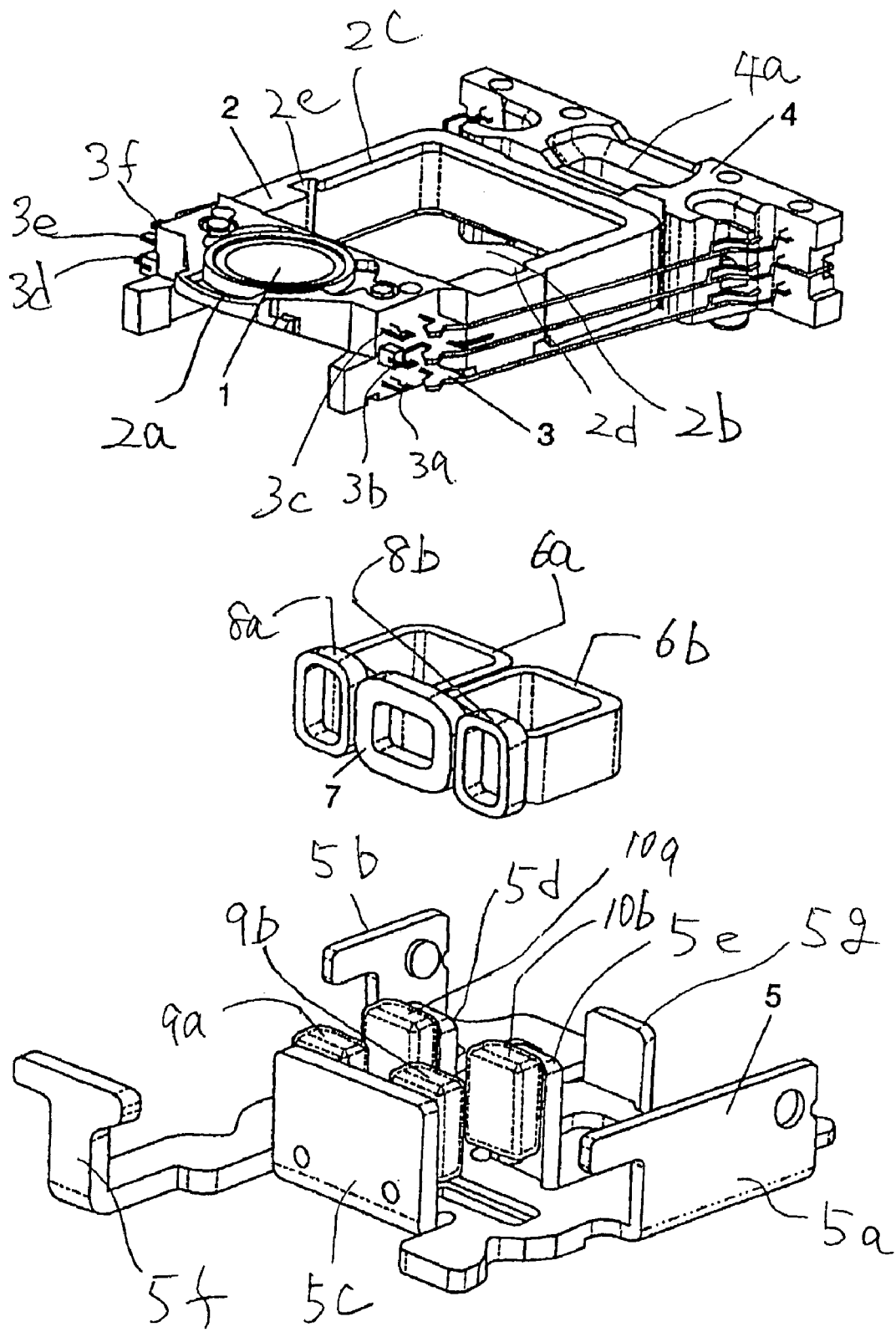
FIG. 3 is an exploded perspective view of FIG. 2.

Referring to FIG. 2, the optical pickup device 24 of an embodiment of the present invention will be explained in detail as follows.

In FIG. 2, reference numeral 1 is an objective lens. Light emergent from a light source not shown is incident on this objective lens 1 via optical parts not shown in the drawing, and the objective lens 1 stops down the incident light, so that the light can be condensed upon an optical disk not shown and information can be recorded on the disk. Reflected light of the light condensed upon the optical disk is incident on the objective lens 1 and then the light is incident on a light receiving element via optical components not shown. The light incident on the light receiving element is converted into an electric signal. The thus obtained electric signal is used for acquiring data and servo control. In this connection, in this embodiment, the objective lens 1 is used as a light condensing means. However, as long as it is possible to condense light to the optical disk, any optical component can be used. (For example, a hologram light condensing member or a diffraction grating condensing member.)

Reference numeral 2 is a lens holder for attaching the objective lens 1. In a portion of the lens holder 2 to which the objective lens 1 is attached, the through-hole 2a (circular or elliptical through-hole) is formed. The objective lens 1 is attached to the through-hole 2a with adhesive in such a manner that this through-hole 2a is closed by the objective lens 1. Except for the through-hole 2a to which the objective lens 1 is attached, the square through-hole 2b, the corners of which are round, are provided. On the side of the through-hole 2b on which the objective lens 1 of the lens holder 2 is arranged, the protruding portion 2c, which extends to the center side of the through-hole 2b, is provided being formed into a substantial C-shape so that the diameter of the through-hole 2b can be smaller than that of the other portion. At the end portion of this protruding portion 2c, a pair of cutout portions 2d, 2e are provided so that a portion of the protruding portion 2c can be cut out.

In this connection, it is preferable that the lens holder 2 is made of insulating resin material. When the lens holder 2 is made of resin material, it becomes easy to manufacture the lens holder 2, and further the weight can be reduced. Epoxy resin, liquid crystal polymer and the like are preferably used as the resin material. In the case of the very thin optical pickup device of the present invention, when the lens holder 2 is made of resin material, the thickness of the lens holder is reduced and the mechanical strength is lowered, however, when the protruding portion 2c is provided as described above, it is possible to provide a somewhat high mechanical strength.

Reference numeral 3 is a suspension wire. Three suspension wires are respectively arranged on both side portions of the lens holder 2. One end portion of each suspension wire 3 is embedded in the lens holder. Further, the end portions 3a to 3f of the suspension wires 3 protrude out again from the suspension holder 2. In this connection, in this embodiment, three suspension wires 3 are respectively arranged on both sides, however, the number of the suspension wires may be not less than four and not more than six. Alternatively, the number of the suspension wires may be two. When the number of the suspension wires is not less than six on one side, it becomes difficult to reduce the thickness. In this connection, the suspension wires 3 are made of elastic conductive material. For example, the suspension wires 3 are composed of linear bodies or flat-plate-shaped bodies made of iron alloy or copper alloy (for example, copper-beryllium alloy).

The suspension wires 3 provided on one side of the lens holder 2 are arranged in the thickness direction of the lens holder at relatively regular intervals. However, according to the specification, the intervals of arranging the suspension wires 3 may not be regular.

Reference numeral 4 is a suspension holder. In the suspension holder 4, the other end portion of each suspension wire 3 is embedded. That is, the suspension holder 4 elastically supports the lens holder 2 via the suspension wires 3 by the cantilever method so that the lens holder 2 can be displaced. A circuit board not shown such as a flexible printed board is attached to the suspension holder 4 or a circuit board not shown such as a flexible printed board is arranged close to the suspension holder 4. This circuit board and the suspension wires 3 are electrically connected with each other. The through-hole 4a is formed in the suspension holder 4.

The suspension holder 4 is made of insulating material. It is preferable that the suspension holder 4 is made of resin, ceramics or the like. Especially, in the case where the suspension holder 4 is made of resin material, it is advantageous to use liquid crystal polymer or epoxy resin from the viewpoints of mechanical strength, weight and easiness of machining.

Reference numeral 5 is a yoke on which the suspension holder 4 is mounted. The yoke 5 is made of magnetic material such as Fe alloy. In this embodiment, the yoke 5 was formed by bending a metal plate made of Fe alloy. A Ni film or Ni alloy film is provided on the surface of the yoke 5. The yoke 5 includes: side vertical portions 5a, 5b, vertical yoke portions 5c, 5d, 5e, a front end vertical portion 5f and a rear end vertical portion 5g which are bent to the same side. The vertical yoke portion 5c and the vertical yoke portions 5d, 5e are arranged being opposed to each other. On the surface of the vertical yoke portion 5c on the vertical yoke portion 5d, 5e side, there are provided a pair of magnets 9a, 9b. On the surfaces of the vertical yoke portions 5d, 5e on the vertical yoke 5c side, there are provided a pair of magnets 10a, 10b. In this case, each vertical yoke portion and each magnet are bonded to each other by ultraviolet-ray-setting adhesive or thermo-setting resin. As an example of the method of attaching each magnet to each vertical yoke portion, since each vertical yoke portion is made of magnetic material, each magnet is attracted to each vertical yoke portion by a magnetic force. Under this condition, ultraviolet-ray-setting adhesive is coated and irradiated with ultraviolet rays so as to fix each magnet to each vertical yoke portion. In this connection, it is preferable that the magnets of the substantially same size and same characteristic are used. That is, when the magnets of the substantially same size and same characteristic are used, it is sufficient to prepare the magnets of one type. Therefore, it is unnecessary to select the magnet in the case of attaching it to each vertical yoke portion. When parts are commonly used as described above, it is possible to enhance the productivity. According to the specification, magnets of different sizes and characteristics can be used. In this embodiment, the two magnets 9a, 9b are attached to the vertical yoke portion 5c, however, one magnet, the width of which is large, may be used, and the direction of the magnetic force may be changed on both sides. Each magnet is composed of a permanent magnet containing Nd and Fe. On the surface of each magnet, there is provided a coat of plating of Ni or Ni alloy, the thickness of which is 10 to 20 μm. In the corner of each magnet, there is provided a chamfered portion or a tapered portion so that each corner can not be damaged.

Reference numerals 6a, 6b are focus coils. Each focus coil 6a, 6b is composed in such a manner that a conductive electric wire made of copper or copper alloy is wound into a square shape, the corners of which are formed round. Further, an insulating coat is provided on the surface of the conductive electric wire. Therefore, even if the conductive electric wire is wound, the conductive electric wires, which are adjacent to each other, are not electrically communicated with each other. Side portions of the focus coils 6a, 6b are bonded to each other by at least one of the thermo-setting adhesive or the ultraviolet-ray-setting resin so that the winding axes of the focus coils 6a, 6b can become substantially parallel to each other.

Reference numerals 7, 8a, 8b are tracking coils. On both sides of the tracking coil 7, the tracking coils 8a, 8b are closely arranged. Alternatively, on both sides of the tracking coil 7, the tracking coils 8a, 8b are arranged leaving a gap. At this time, the winding axes of the tracking coils 7, 8a, 8b are arranged so that they can be substantially parallel to each other. The tracking coils 7, 8a, 8b are bonded to the side portion of an assembled body, in which the focus coils 6a, 6b are joined to each other, by at least one of thermo-setting adhesive and the ultraviolet-ray-setting resin in such a manner that the winding axes of the tracking coils 7, 8a, 8b and the winding axes of the focus coils 6a, 6b are not parallel to each other, preferably in such a manner that the winding axes of the tracking coils 7, 8a, 8b and the winding axes of the focus coils 6a, 6b are perpendicular to each other. The tracking coils 7, 8a, 8b are electrically joined to each other, that is, the tracking coils 7, 8a, 8b are composed of the same electric wire and integrated into one body. In this case, the tracking coils 7, 8a, 8b are connected in series to each other. Each tracking coil 7, 8a, 8b is composed in such a manner that a conductive electric wire made of copper or copper alloy is wound into a square shape, the corners of which are formed round. Further, an insulating coat is provided on the surface of the conductive electric wire. Therefore, even if the conductive electric wire is wound, the conductive electric wires, which are adjacent to each other, are not electrically communicated with each other.

Each focus coil 6a, 6b is wound into a shape, the cross section of which is square, and each tracking coil 7, 8a, 8b is wound into a shape, the cross section of which is rectangular. The tracking coils 8a, 8b are respectively attached to the focus coils 6a, 6b so that the long sides of the tracking coils 8a, 8b can be substantially parallel with the winding axes of the focus coils 6a, 6b. The tracking coil 7 is attached to the focus coils 6a, 6b so that the long side of the tracking coil 7 can be substantially perpendicular to the winding axes of the focus coils 6a, 6b.

A coil composition body in which the focus coils 6a, 6b and the tracking coils 7, 8a, 8b are combined with each other is attached to the lens holder 2. At this time, the coil composition body is inserted from the side opposite to the side on which the protruding portion 2c of the through-hole 2b is provided. Outer circumferential portions of the focus coils 6a, 6b of the coil composition body, which has been inserted, come into contact with this protruding portion 2c and are held in the through-hole 2b of the lens holder 2. At this time, the outer circumferential portions of the tracking coils 8a, 8b enters the cutout portions 2e, 2d, and the upper faces of the tracking coils 8a, 8b protrude out from the protruding portion 2c. The coil composition body is fixed to the lens holder 2 with thermo-setting adhesive such as thermo-setting epoxy resin.

After the coil composition body has been fixed to the lens holder 2, the suspension holder 4 is fixed to the yoke 5 with at least one of the thermo-setting adhesive and the ultraviolet ray-setting resin. At this time, the rear end vertical portion 5g is inserted into the through-hole 4a of the suspension holder 4, and the vertical yoke portions 5c, 5d, 5e and the magnets 9a, 9b, 10a, 10b are inserted into the through-hole 2b of the lens holder 2. The vertical yoke portion 5d and the magnet 10a are inserted into the focus coil 6a, and the vertical yoke portion 5e and the magnet 10b are inserted into the focus coil 6b. Between the vertical yoke portion 5c and the vertical yoke portions 5d, 5e, the focus coils 6a, 6b, to which the tracking coils 7, 8a, 8b are attached, are arranged.

Although not shown in the drawing, both end portions of the focus coil 6a are respectively wound round the end portions 3f, 3e of the suspension wire 3 and joined with solder or the like. Both end portions of the focus coil 6b are respectively wound round the end portions 3c, 3b of the suspension wire 3 and joined with solder or the like. Both end portions of the tracking coils 7, 8a, 8b are respectively wound round the end portions 3a, 3d and joined with solder or the like. In this connection, in this embodiment, the focus coils 6a, 6b are separately composed. However, when the focus coils 6a, 6b are connected in series to each other in the same manner as the tracking coils 7, 8a, 8b, the end portion of the focus coil 6a is connected to the end portion 3f, and the end portion of the focus coil 6b is connected to the end portion 3c. At this time, the end portions 3b, 3e are not electrically connected to the coils.

Accordingly, at least one of the information recording and the information reproducing can be positively conducted as follows. When an electric current is selectively made to flow in each suspension wire 3, the electric current is made to flow in each coil. In the magnetic circuit composed of the magnetic field generated by each coil and the magnetic field generated by the magnets 9a, 9b, 10a, 10b, the lens holder 2 is moved in the direction having at least one of the focusing direction component and the tracking direction component. For example, according to a servo signal generated by the reflected light on an optical disk, the objective lens 1 is moved in the focusing direction or the tracking direction, so that the light is condensed to a data track formed on the optical disk. In this way, at least one of the information recording and the information reproducing can be positively conducted.

In FIG. 4, FIG. 4(a) is a plan view showing a primary portion of the magnetic circuit portion of FIG. 2, FIG. 4(b) is a side view of FIG. 4(a), and FIG. 4(c) is a view taken on line A—A in FIG. 4(a). As shown in FIG. 4(a), the direction of the magnetic field of the magnets 9a, 10a opposed to each other is shown by arrow Ja, and the direction of the magnetic field of the magnets 9b, 10b opposed to each other is shown by arrow Jb. As shown by arrows Ja and Jb, the magnetic fluxes proceed in the opposite direction to each other. That is, on the surfaces of the magnets 9a, 9b, N-pole and S-pole are respectively formed. On the surfaces of the magnets 10a, 10b, S-pole and N-pole are respectively formed.

As shown in FIG. 4(c), gap P1 between the focus coils 7 and 8a and gap P2 between the focus coils 7 and 8b are respectively set in the range from 0 to 1.5 mm. Gaps P1 and P2 may be different from each other in this range. Alternatively, gaps P1 and P2 may be the same with each other in this range. In the case of P1, P2=0, the side portions of the focus coils 7, 8a, 8b are closely contacted with each other. In this case, it is difficult for the tracking coils 8a, 8b to be disconnected from the magnetic field composed by the magnets. When gaps P1 and P2 are larger than 0 mm, a gap is substantially generated between the tracking coils 7, 8a, 8b. Therefore, when the coil composition body is composed, it is possible to pour adhesive into this gap. Accordingly, it is possible to obtain a strong coil composition body.

In FIG. 4(c), heights P3 of the tracking coils 7, 8a, 8b are the same. However, according to the specification, only height P3 of the tracking coil 7 may be made to be larger than that of the other coils. Alternatively, the height of at least one of the tracking coils 8a, 8b is made to be larger than that of the other coils. Further, the winding numbers of the tracking coils 8a, 8b may be the same. Furthermore, the winding numbers of the tracking coils 8a, 8b may be in the range of ±25%. For example, in the case where the winding number of the tracking coil 8a is 20, the winding number of the tracking coil 8b is determined in the range from 15 to 25. Furthermore, the winding number of the tracking coil 7 may be at least not less than one. In this embodiment, the winding numbers of the tracking coils 8a and 8b were respectively set at 18, and the winding number of the tracking coil 7 was set at 32.

Further, as shown in FIG. 4(b), it is composed that heights P3 of the tracking coils 7, 8a, 8b are larger than the height of the focus coils 6a, 6b. Furthermore, in the upper and lower portion, the tracking coils 7, 8a, 8b are respectively protruded by the heights of P4 and P5. The reason is that the heights of the tracking coils 7, 8a, 8b are increased as large as possible so as to increase the driving force. The reason why gap P4 in the upper portion is larger than gap P5 is that the protruding portion 2c of the lens holder 2 enters this gap P4. That is, when the thickness of the protruding portion 2c is increased, even if the pickup is made thin, the rigidity of the lens holder 2 can be enhanced. Although it is possible to make gap P5 larger than gap P4, when gap P5 is made larger than P4, the yoke 5 comes into contact with the tracking coils 7, 8a, 8b. Therefore, it is not preferable.

In FIG. 5, FIG. 5(a) is a view taken on line A—A in FIG. 4(a). FIG. 5(a) shows a state in which the tracking coil 7 and the tracking coils 8a, 8b are located at the neutral positions. FIG. 5(b) shows a state in which focus shifting is conducted in FIG. 5(a). FIG. 5(c) shows a state in which tracking shift is further conducted in FIG. 5(b).

The focus coils 6a, 6b and the tracking coils 7, 8a, 8b are arranged so that they are incorporated into the magnetic circuit composed of the magnets 9a, 9b, 10a, 10b. When an electric current is made to flow in the focus coils 6a, 6b and the tracking coils 7, 8a, Bb, according to the Fleming's left-hand rule, it is possible to drive the lens holder 2 in the focusing direction and the tracking direction.

In this case, when the two focus coils 6a, 6b are wired in series to each other, only a motion in the focusing direction is conducted. When the two focus coils 6a, 6b are wired in parallel to each other, that is, when an electric current is independently supplied to the two focus coils 6a, 6b, an independent motion in the focusing direction can be conducted. Since a difference can be made between the driving forces in the focusing direction, it is possible to generate a twisting tilt in the radial direction.

In this connection, since the behavior of the lens holder 2 can be shown by the focusing coils 6a, 6b and the tracking coils 7, 8a, 8b, the objective lens 1 and the lens holder 2 are omitted in FIGS. 4 and 5. As shown in FIG. 4(c), the upper and lower horizontal portions of the tracking coils 7, 8a, 8b overlap the end portions of the upper and lower horizontal portions of the magnets 9a, 9b, 10a, 10b.

Operation of the optical pickup device of the present invention composed as described above will be explained below. As shown in FIG. 4(a), the magnetic poles of the magnets 9a, 9b, 10a, 10b are arranged in the yoke 5, and the magnetic field proceeds in the directions of arrows Ja and Jb. At this time, for example, when the focusing coils 6a, 6b are electrified as shown by arrow If in FIG. 4(a), the focus coils 6a, 6b are given a force of arrow Ff in FIG. 5(a) by the Fleming's left-hand rule. Therefore, the lens holder 2 is moved upward in the drawing as shown in FIG. 5(b).

In the same manner, for example, as shown by arrow It in FIG. 5(b), when the tracking coils 7, 8a, 8b are energized, according to the Fleming's left-hand rule, the tracking coils 7, 8a, 8b are given a force of arrow Ft, and the lens holder 2 is moved to the left in the drawing as shown in FIG. 5(c). As a result of energizing the tracking coils 7, 8a, 8b, the lens holder 2 is given a composite force in which forces Ff and Ft are compounded with each other. Therefore, the lens holder 2 is moved to the position shown in FIG. 5(c).

As a result, in the same manner as that of the conventional device, under the condition that the coil composition body, which is composed of the focus coils 6a, 6b and the tracking coils 7, 8a, 8b, is offset to the left in FIG. 5(c), force Ff in the focusing direction is given. Therefore, as shown by the arrow in the drawing, the lens holder 2 is given a counterclockwise angular moment (Mccw)Mf.

On the other hand, portions of the tracking coils 7, 8a, 8b, in which electric current It flows so that the portions are related to the magnets 9a, 9b, 10a, 10b, are horizontal portions shown by the net pattern in the drawing. Therefore, as shown by arrow Mta in the drawing, by the net pattern horizontal portion overlapping the tracking coil 7, the lens holder 2 is given a counterclockwise angular moment (Mccw). By the net pattern horizontal portions overlapping the tracking coils 8a, 8b, as shown by arrow Mtb in the drawing, the lens holder 2 is given a clockwise angular moment (Mcw).

In this way, angular moment Mf, Mta and Mtb are generated in the lens holder 2. The positional relations between the tracking coils 7, 8*a*, 8*b* and the magnets 9*a*, 9*b*, 10*a*, 10*b* are set so that the angular moment can satisfy the following equation.

$$Mf+Mta=Mtb$$

Due to the foregoing, while the lens holder 2 is maintaining its original posture, the lens holder 2 moves in the focusing and the tracking direction so that no inclination is caused.

In this connection, in the example of operation explained above, when either the directions of electric currents flowing in the focus coils 6*a*, 6*b* and the tracking coils 7, 8*a*, 8*b* or the directions of the magnetic fields of the magnets 9*a*, 9*b*, 10*a*, 10*b* are opposite, the moving direction of the lens holder 2 shown in FIG. 5(*c*) becomes opposite. However, even in this case, the same effect can be provided by the same operation principle. Therefore, the redundant explanations are omitted here.

What is claimed is:

1. An optical pickup device comprising:
   a light condensing section that condenses light emergent from a light source to an optical disk;
   a light condensing holder on which the light condensing section is mounted;
   a suspension holder for elastically supporting the light condensing holder;
   a focus coil mounted on the light condensing holder;
   a tracking coil mounted on the light condensing holder; and
   a magnetic field impression section that impresses a magnetic field upon the focus coil and the tracking coil, wherein:
   the tracking coil is composed of at least a first to a third tracking coil portion combined with each other, and
   the focus coil comprises a first focus coil portion and a second focus coil portion which are joined to each other so that the winding axes of the first and the second focus coil portions can be substantially parallel to each other.

2. An optical pickup device according to claim 1, wherein the light condensing section is an objective lens.

3. An optical pickup device according to claim 1, wherein the first focus coil portion and the second focus coil portion are independently supplied with electric currents.

4. An optical pickup device according to claim 1, wherein the first focus coil portion and the second focus coil portion are connected in series to each other.

5. An optical pickup device according to claim 1, wherein the second and the third tracking coil portions are arranged on both sides of the first tracking coil portion so that the winding axes of the first to the third tracking coil portions can be substantially parallel to each other.

6. An optical pickup device according to claim 1, wherein the winding number of the first tracking coil portion is made to be larger than the winding numbers of the second and the third tracking coil portions.

7. An optical pickup device according to claim 1, wherein the first to the third tracking coil portion portions are connected in series to each other.

8. An optical pickup device according to claim 1, wherein a coil composition body is composed of the focus coil and the tracking coil portions joined to both side portions of the focus coil by adhesion, and the winding axis of the focus coil and the winding axes of the tracking coil portions are substantially perpendicular to each other.

9. An optical pickup device according to claim 8, wherein a gap is respectively formed among the first, the second and the third tracking coil portions.

10. An optical pickup device according to claim 8, wherein the side portions of the first, the second and the third tracking coil portions are contacted with each other so that no gaps are formed among them.

11. An optical pickup device according to claim 8, wherein a through-hole is formed in the light condensing holder and the coil composition body is fixed in the through-hole.

12. An optical pickup device according to claim 11, wherein a protruding portion is provided on one side of the through-hole, and an outer circumferential portion of the focus coil comes into contact with the protruding portion.

13. An optical pickup device according to claim 1, wherein the magnetic field impression section is composed of a plurality of magnets, and one portion of the tracking coil and one portion of the focus coil are arranged between the magnets.

* * * * *